(No Model.)

W. H. COE.
METHOD OF PACKING DECORATIVE FILMS.

No. 472,252. Patented Apr. 5, 1892.

WITNESSES:
Chas. H. Luther Jr.
M. H. Bligh

INVENTOR:
Walter H. Coe
by Joseph A. Miller & Co.
Attys.

UNITED STATES PATENT OFFICE.

WALTER H. COE, OF PROVIDENCE, RHODE ISLAND.

METHOD OF PACKING DECORATIVE FILMS.

SPECIFICATION forming part of Letters Patent No. 472,252, dated April 5, 1892.

Application filed January 6, 1892. Serial No. 417,203. (No specimens.)

*To all whom it may concern:*

Be it known that I, WALTER H. COE, of the city of Providence, in the county of Providence and State of Rhode Island, have invented certain new and useful Improvements in Methods for Packing Gilding-Films; and I hereby declare that the following is a full, clear, and exact description of the same, reference being had to the accompanying drawings, forming part of this specification.

This invention has reference to improvements in methods for packing metallic decorative films.

The object of the invention is to so pack the films described as to obviate the usual waste in the use of the same.

The further object of this invention is to form a package of metallic or other decorative films which will facilitate the use of said films.

Another object of the invention is to produce a package of decorative films adapted to be secured directly in a suitable machine for applying the same.

The invention consists in the peculiar method of cutting the films into narrow ribbons, providing a backing for the same of substantially a corresponding width and length, and the combination therewith of a suitable mechanism to receive these strips or ribbons.

Figure 1:
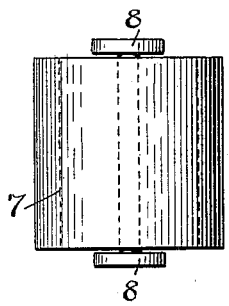
Figure 2:
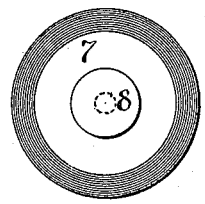
Figure 3:
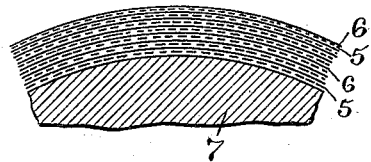

Figure 1 represents a top view of a package of films arranged in the improved manner. Fig. 2 represents an end view of the same. Fig. 3 represents an enlarged cross-sectional view of a portion of the improved package, showing the positions therein of the films and their protective backing.

Similar numbers of reference designate corresponding parts throughout.

Decorative films as heretofore packed, and especially "gold-leaf," so called, have been arranged in small books, the sheets of the films alternating with the protecting-leaves of the book. In applying these films for decorative purposes it has been the custom to cut these books and the films contained therein into short strips of approximately the width of the portion to be gilded, the user being obliged to apply these strips to the work in succession. Owing to the use of these short pieces, numberless joints in the gilding were made, and in order to cover these joints the strips were lapped, occasioning the use of a large amount of practically waste material; also, when these joints were not most carefully burnished and secured the corners of the films had a tendency to curl, especially when acted upon by the rays of the sun, combined with suitable conditions of the weather. Furthermore, it has been necessary to cut the films considerably wider than the portion of the article to be gilded, the remainder after burnishing being wasted, and in outdoor work in windy weather it has been almost impossible to apply the films satisfactorily.

My improved method of packing the films is devised with the intention of overcoming the objections thus mentioned, and in carrying my invention into effect I take a sheet of film (indicated in Fig. 3 of the drawings by the dotted lines 5 5) and cut the same into strips or ribbons of suitable widths. I then place these strips upon a protecting-strip 6 6 of paper or other suitable material properly treated, and, if necessary, having a slightly-adhesive surface. I finally wind these strips 5 5 and 6 6 around a spool 7 of any suitable shape and in a manner so that when unwound by running the spool over a surface the film will lie next said surface. The spool 7 may be provided with a longitudinal perforation, through which a shaft may extend having flanged ends similar to those marked 8 8, which are adapted to be held between the thumb and first finger when the film is to be used in hand-work, this spool 7 also being adapted to be secured in a machine by which the film is automatically unwound when passed over a surface.

It is obvious that by this improved method of packing the film may be applied in long lengths without joints, thus saving the extra material now used in overlapping the same. As no strain is exerted on the film, it will not be broken, and as the films are cut in widths to suit the work very little will be wasted from the edges. In outdoor work only a small portion of the film is exposed to the wind, and that is held around the spool. The protecting-ribbon may be slightly longer than the film, and the overlapping end may be glued down onto the next lower layer when the winding is completed. The complete packages may be packed in suitable boxes.

Having thus described my invention, I claim as new and desire to secure by Letters Patent—

The herein-described method of packing decorative films, consisting in cutting or forming the films into ribbons, applying these ribbons to protecting-strips having a slightly-adhesive surface, and winding the said ribbons and strips on spools of the same width as the ribbons, constructed to press the film down on the part to be gilded as the film is unwound therefrom, as described.

WALTER H. COE.

Witnesses:
J. A. MILLER, Jr.,
JOSEPH A. MILLER.